US012588973B2

(12) United States Patent
Moss et al.

(10) Patent No.: US 12,588,973 B2
(45) Date of Patent: *Mar. 31, 2026

(54) REDUCED REGISTRATION BONDING TEMPLATE

(71) Applicant: ALIGN TECHNOLOGY, INC., San Jose, CA (US)

(72) Inventors: Jon Moss, Antioch, CA (US); Rok Sribar, Auburn, CA (US)

(73) Assignee: Align Technology, Inc., San Jose, CA (US)

( * ) Notice: Subject to any disclaimer, the term of this patent is extended or adjusted under 35 U.S.C. 154(b) by 534 days.

This patent is subject to a terminal disclaimer.

(21) Appl. No.: 17/714,882

(22) Filed: Apr. 6, 2022

(65) Prior Publication Data

US 2022/0401184 A1    Dec. 22, 2022

Related U.S. Application Data

(60) Continuation of application No. 16/582,052, filed on Sep. 25, 2019, now Pat. No. 11,317,990, which is a continuation of application No. 15/650,548, filed on Jul. 14, 2017, now Pat. No. 10,470,848, which is a continuation of application No. 13/846,322, filed on Mar. 18, 2013, now Pat. No. 9,744,002, which is a division of application No. 12/338,307, filed on Dec. 18, 2008, now Pat. No. 8,401,686.

(51) Int. Cl.
*A61C 7/02* (2006.01)
*A61C 7/00* (2006.01)
*A61C 7/14* (2006.01)
*B33Y 50/00* (2015.01)
*B33Y 80/00* (2015.01)

(52) U.S. Cl.
CPC ............... *A61C 7/02* (2013.01); *A61C 7/002* (2013.01); *A61C 7/146* (2013.01); *B33Y 50/00* (2014.12); *B33Y 80/00* (2014.12)

(58) Field of Classification Search
CPC ..................................................... A61C 7/146
See application file for complete search history.

(56) References Cited

U.S. PATENT DOCUMENTS

| | | | |
|---|---|---|---|
| 5,820,368 | A | 10/1998 | Wolk |
| 6,386,864 | B1 | 5/2002 | Kuo |
| 6,454,565 | B2 | 9/2002 | Phan et al. |
| 6,471,511 | B1 | 10/2002 | Chishti et al. |
| 6,607,382 | B1 | 8/2003 | Kuo et al. |
| 6,783,604 | B2 | 8/2004 | Tricca |
| 6,790,035 | B2 | 9/2004 | Tricca et al. |
| 6,814,574 | B2 | 11/2004 | Abolfathi et al. |
| 6,830,450 | B2 | 12/2004 | Knopp et al. |
| 6,947,038 | B1 | 9/2005 | Anh et al. |
| 7,074,039 | B2 | 7/2006 | Kopelman et al. |

(Continued)

*Primary Examiner* — Ralph A Lewis
(74) *Attorney, Agent, or Firm* — Shay Glenn LLP

(57) ABSTRACT

A dental template for positioning one or more objects on teeth of a patient is disclosed. The dental template can include a plurality of teeth-receiving cavities that further incldue occlusal surface that correspond to occlusal surfaces of teeth. The template can also inclue buccal surfaces that conform to buccal tooth surfaces. The buccal surfaces of the template can include openings to control placement of one or more objects on the patient's teeth.

20 Claims, 5 Drawing Sheets

(56)　　　　　References Cited

U.S. PATENT DOCUMENTS

| | | |
|---|---|---|
| 7,104,792 B2 | 9/2006 | Taub et al. |
| 7,121,825 B2 | 10/2006 | Chishti et al. |
| 7,160,107 B2 | 1/2007 | Kopelman et al. |
| 7,192,273 B2 | 3/2007 | McSurdy, Jr. |
| 7,347,688 B2 | 3/2008 | Kopelman et al. |
| 7,354,270 B2 | 4/2008 | Abolfathi et al. |
| 7,448,514 B2 | 11/2008 | Wen |
| 7,481,121 B1 | 1/2009 | Cao |
| 7,543,511 B2 | 6/2009 | Kimura et al. |
| 7,553,157 B2 | 6/2009 | Abolfathi et al. |
| 7,766,658 B2 | 8/2010 | Tricca et al. |
| 7,771,195 B2 | 8/2010 | Knopp et al. |
| 7,854,609 B2 | 12/2010 | Chen et al. |
| 7,871,269 B2 | 1/2011 | Wu et al. |
| 7,878,801 B2 | 2/2011 | Abolfathi et al. |
| 7,878,805 B2 | 2/2011 | Moss et al. |
| 7,883,334 B2 | 2/2011 | Li et al. |
| 7,914,283 B2 | 3/2011 | Kuo |
| 7,947,508 B2 | 5/2011 | Tricca et al. |
| 8,152,518 B2 | 4/2012 | Kuo |
| 8,172,569 B2 | 5/2012 | Matty et al. |
| 8,292,617 B2 | 10/2012 | Brandt et al. |
| 8,337,199 B2 | 12/2012 | Wen |
| 8,401,686 B2* | 3/2013 | Moss .................... A61C 7/002 |
| | | 700/118 |
| 8,517,726 B2 | 8/2013 | Kakavand et al. |
| 8,562,337 B2 | 10/2013 | Kuo et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,771,149 B2 | 7/2014 | Rahman et al. |
| 8,899,976 B2 | 12/2014 | Chen et al. |
| 8,899,977 B2 | 12/2014 | Cao et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,161,823 B2 | 10/2015 | Morton et al. |
| 9,241,774 B2 | 1/2016 | Li et al. |
| 9,433,476 B2 | 9/2016 | Khardekar et al. |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 9,744,002 B2* | 8/2017 | Moss .................... A61C 7/002 |
| 9,844,424 B2 | 12/2017 | Wu et al. |
| 10,045,835 B2 | 8/2018 | Boronkay et al. |
| 10,052,177 B2* | 8/2018 | Andreiko ............... A61C 7/146 |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,470,848 B2* | 11/2019 | Moss .................... A61C 7/002 |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,794,324 B2 | 10/2020 | Mori et al. |
| 10,813,720 B2 | 10/2020 | Grove et al. |
| 10,874,483 B2 | 12/2020 | Boronkay |
| 10,881,487 B2 | 1/2021 | Cam et al. |
| 10,912,629 B2 | 2/2021 | Tanugula et al. |
| 10,959,810 B2 | 3/2021 | Li et al. |
| 10,993,783 B2 | 5/2021 | Wu et al. |
| 11,026,768 B2 | 6/2021 | Moss et al. |
| 11,026,831 B2 | 6/2021 | Kuo |
| 11,045,282 B2 | 6/2021 | Kopelman et al. |
| 11,045,283 B2 | 6/2021 | Riley et al. |
| 11,103,330 B2 | 8/2021 | Webber et al. |
| 11,123,156 B2 | 9/2021 | Cam et al. |
| 11,154,382 B2 | 10/2021 | Kopelman et al. |
| 11,166,788 B2 | 11/2021 | Webber |
| 11,174,338 B2 | 11/2021 | Liska et al. |
| 11,219,506 B2 | 1/2022 | Shanjani et al. |
| 11,259,896 B2 | 3/2022 | Matov et al. |
| 11,273,011 B2 | 3/2022 | Shanjani et al. |
| 11,278,375 B2 | 3/2022 | Wang et al. |
| 11,317,990 B2* | 5/2022 | Moss .................... A61C 7/146 |
| 11,318,667 B2 | 5/2022 | Mojdeh et al. |
| 11,331,166 B2 | 5/2022 | Morton et al. |
| 11,344,385 B2 | 5/2022 | Morton et al. |
| 11,376,101 B2 | 7/2022 | Sato et al. |
| 11,419,702 B2 | 8/2022 | Sato et al. |
| 11,419,710 B2 | 8/2022 | Mason et al. |
| 11,471,253 B2 | 10/2022 | Venkatasanthanam et al. |
| 11,497,586 B2 | 11/2022 | Kopelman |
| 11,504,214 B2 | 11/2022 | Wu et al. |
| 11,523,881 B2 | 12/2022 | Wang et al. |
| 11,534,268 B2 | 12/2022 | Li et al. |
| 11,534,974 B2 | 12/2022 | O'Leary et al. |
| 11,554,000 B2 | 1/2023 | Webber |
| 11,564,777 B2 | 1/2023 | Kopelman et al. |
| 11,571,278 B2 | 2/2023 | Kopelman et al. |
| 11,571,279 B2 | 2/2023 | Wang et al. |
| 11,576,750 B2 | 2/2023 | Kopelman et al. |
| 11,576,752 B2 | 2/2023 | Morton et al. |
| 11,589,955 B2 | 2/2023 | Medvinskaya et al. |
| 11,596,502 B2 | 3/2023 | Webber et al. |
| 11,602,414 B2 | 3/2023 | Sato et al. |
| 11,642,194 B2 | 5/2023 | Boronkay et al. |
| 11,642,198 B2 | 5/2023 | Kopelman et al. |
| 11,666,415 B2 | 6/2023 | Wang et al. |
| 11,701,203 B2 | 7/2023 | Makarenkova et al. |
| 11,737,857 B2 | 8/2023 | Derakhshan et al. |
| 11,779,243 B2 | 10/2023 | Li et al. |
| 11,779,437 B2 | 10/2023 | Cam et al. |
| 11,793,606 B2 | 10/2023 | Cam et al. |
| 11,931,222 B2 | 3/2024 | Webber et al. |
| 11,931,223 B2 | 3/2024 | Shanjani et al. |
| 11,937,991 B2 | 3/2024 | Webber et al. |
| 11,980,523 B2 | 5/2024 | Morton et al. |
| 11,996,181 B2 | 5/2024 | Xue et al. |
| 2002/0192617 A1 | 12/2002 | Phan et al. |
| 2003/0190584 A1* | 10/2003 | Heasley .................. A61C 5/82 |
| | | 433/136 |
| 2004/0166462 A1 | 8/2004 | Phan et al. |
| 2004/0166463 A1 | 8/2004 | Wen et al. |
| 2004/0253562 A1* | 12/2004 | Knopp .................... A61C 7/146 |
| | | 433/213 |
| 2005/0014105 A1 | 1/2005 | Abolfathi et al. |
| 2005/0042569 A1* | 2/2005 | Phan .................. A61C 13/0004 |
| | | 433/24 |
| 2005/0186524 A1 | 8/2005 | Abolfathi et al. |
| 2005/0233276 A1* | 10/2005 | Kopelman ............... A61C 7/08 |
| | | 433/3 |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0115782 A1 | 6/2006 | Li et al. |
| 2006/0115785 A1 | 6/2006 | Li et al. |
| 2006/0199142 A1 | 9/2006 | Liu et al. |
| 2006/0234179 A1 | 10/2006 | Wen et al. |
| 2007/0031775 A1* | 2/2007 | Andreiko ............... A61C 7/146 |
| | | 433/24 |
| 2008/0118882 A1 | 5/2008 | Su |
| 2008/0160473 A1 | 7/2008 | Li et al. |
| 2008/0286716 A1 | 11/2008 | Sherwood |

(56)     References Cited

U.S. PATENT DOCUMENTS

| | | | |
|---|---|---|---|
| 2008/0286717 | A1 | 11/2008 | Sherwood |
| 2009/0280450 | A1 | 11/2009 | Kuo |
| 2010/0055635 | A1 | 3/2010 | Kakavand |
| 2010/0129763 | A1 | 5/2010 | Kuo |
| 2011/0091832 | A1* | 4/2011 | Kim ........................ B29C 64/00 |
| | | | 700/119 |
| 2011/0269092 | A1 | 11/2011 | Kuo et al. |
| 2014/0067334 | A1 | 3/2014 | Kuo |
| 2017/0007359 | A1 | 1/2017 | Kopelman et al. |
| 2019/0046297 | A1 | 2/2019 | Kopelman et al. |
| 2019/0099129 | A1 | 4/2019 | Kopelman et al. |
| 2020/0155276 | A1 | 5/2020 | Cam et al. |
| 2020/0188062 | A1 | 6/2020 | Kopelman et al. |
| 2021/0147672 | A1 | 5/2021 | Cole et al. |

* cited by examiner

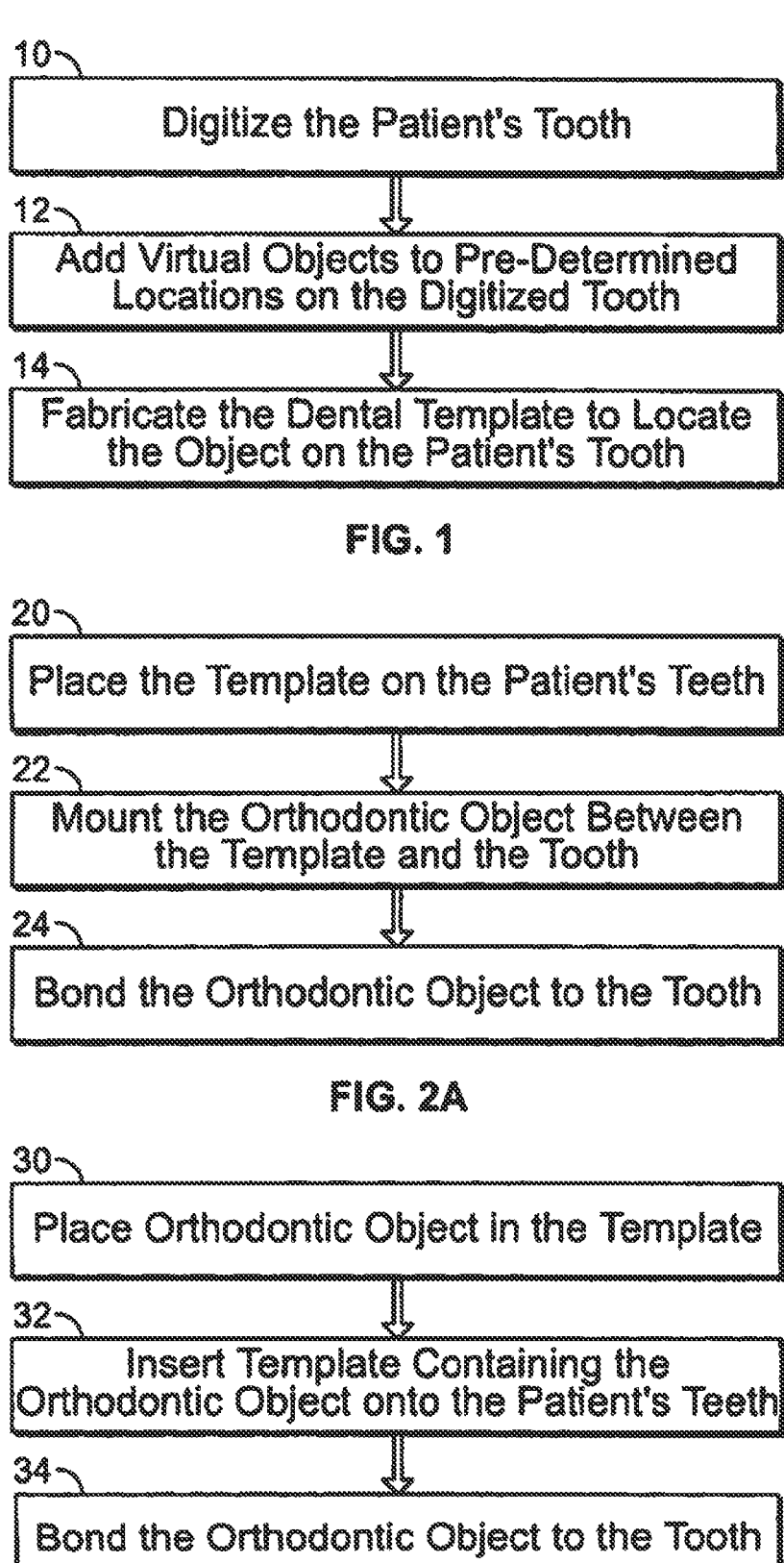

10

Digitize the Patient's Tooth

12

Add Virtual Objects to Pre-Determined
Locations on the Digitized Tooth

14

Fabricate the Dental Template to Locate
the Object on the Patient's Tooth

Place the Template on the Patient's Teeth

22

Mount the Orthodontic Object Between
the Template and the Tooth

24

Bond the Orthodontic Object to the Tooth

Place Orthodontic Object in the Template

32

Insert Template Containing the
Orthodontic Object onto the Patient's Teeth

34

Bond the Orthodontic Object to the Tooth

FIG. 2B

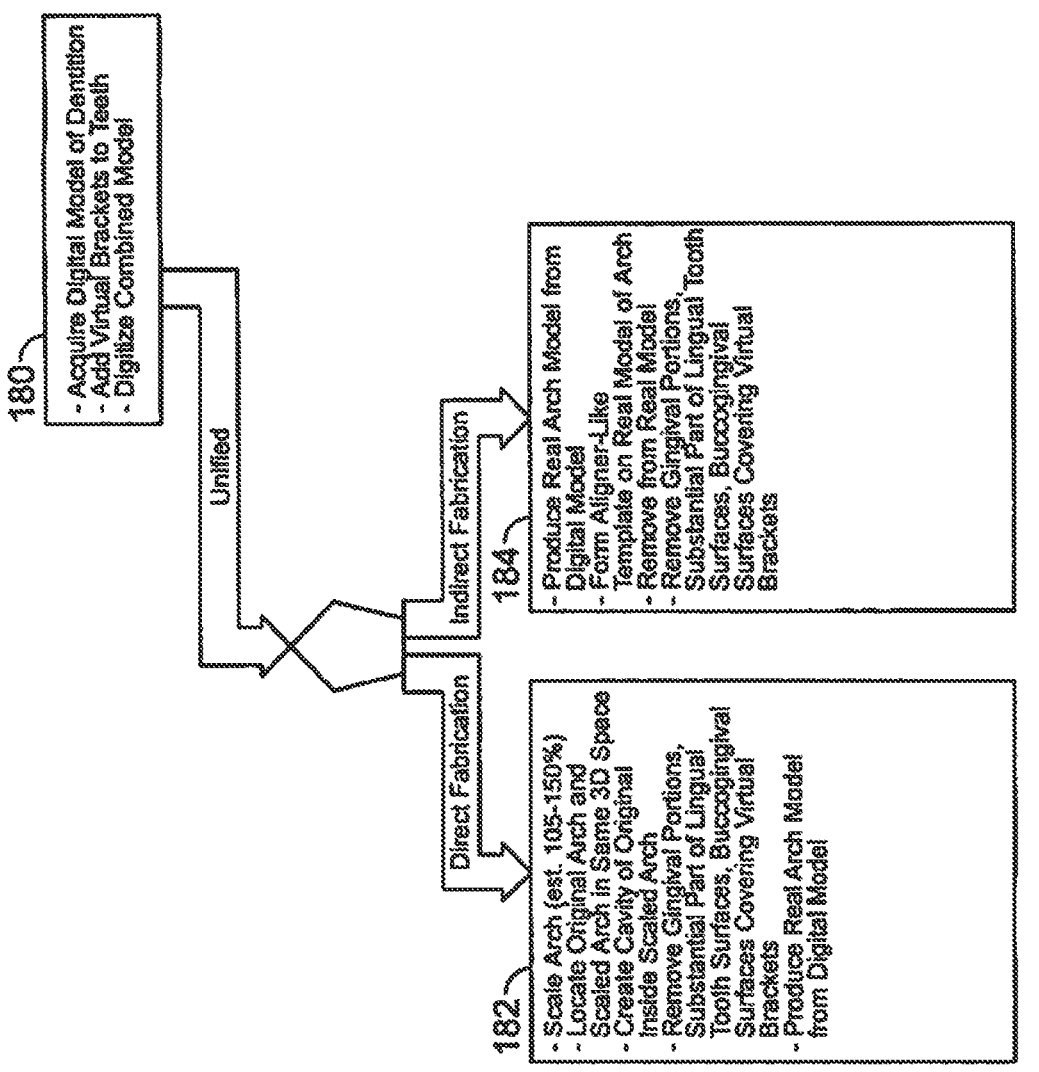

FIG. 3B

180
- Acquire Digital Model of Dentition
- Add Virtual Brackets to Teeth
- Digitize Combined Model Unified Direct Fabrication Indirect Fabrication 182
- Scale Arch (est. 105-150%)
- Locate Original Arch and Scaled Arch in Same 3D Space
- Create Cavity of Original Inside Scaled Arch
- Remove Gingival Portions, Substantial Part of Lingual Tooth Surfaces, Buccogingival Surfaces Covering Virtual Brackets
- Produce Real Arch Model from Digital Model 184
- Produce Real Arch Model from Digital Model
- Form Aligner-Like Template on Real Model of Arch
- Remove from Real Model
- Remove Gingival Portions, Substantial Part of Lingual Tooth Surfaces, Buccogingival Surfaces Covering Virtual Brackets

REDUCED REGISTRATION BONDING TEMPLATE

CROSS-REFERENCE

This application is a continuation of U.S. application Ser. No. 16/582,052, filed Sep. 25, 2019, which is a continuation of U.S. application Ser. No. 15/650,548, filed Jul. 14, 2017, now U.S. Pat. No. 10,470,848, issued Nov. 12, 2019, which is a continuation of U.S. application Ser. No. 13/846,322, filed Mar. 18, 2013, now U.S. Pat. No. 9,744,002, issued Aug. 29, 2017, which is a divisional of U.S. application Ser. No. 12/338,307, filed Dec. 18, 2008, now U.S. Pat. No. 8,401,686, issued Mar. 19, 2013, the entirety of each are incorporated herein by reference.

BACKGROUND

The present invention relates generally to the field of orthodontics, and more particularly to an apparatus for bonding an orthodontic bracket to a tooth and a method for making the same.

The fundamental objectives in orthodontics are to move a patient's teeth to a position where the mechanical function of the dentition is optimized and to improve the aesthetic appearance of the patient's teeth. The traditional method that orthodontists use is to attach brackets and wires onto the patient's dentition. Once mounted on the teeth, the wires exert continual light forces through the brackets onto the teeth. These forces initiate the body's biological bone remodeling response and the teeth gradually progress toward their desired final positions. During the treatment period, the treatment professional reactively adjusts the wires and bands to provide a new force and move the teeth toward their desired or final destination.

Orthodontic brackets are often bonded directly to the patient's teeth using a small quantity of adhesive placed on the base of each bracket and the bracket is then placed on a selected tooth while the patient is in the dental chair. Once the adhesive has hardened, the bracket is bonded to the tooth with sufficient strength to withstand subsequent orthodontic forces as treatment progresses. One shortcoming with this technique is the difficulty in accessing the optimal position on the tooth surface for bracket placement on severely crowded teeth or in teeth where the bonding surface is obstructed by teeth in the opposing arch during jaw closure. With posterior teeth, the treatment professional may have difficulty seeing the precise position of the bracket relative to the tooth surface due to limited working space. Also, for most bonding agents, it is necessary to minimize moisture contamination from the patient's saliva for adequate bonding strength. This can prolong the procedure and also unduly impair the accuracy of placement of the brackets on the teeth.

One way to overcome some of the limitations of direct bracket placement is with indirect bonding. Typically, a routine impression of each of the patient's upper and lower dental arches is taken and either sent to a lab or used in the office to create a replica plaster model of each impression after the patient has left the office. Brackets are bonded to the sealed plaster models using a temporary adhesive. A transfer tray is then made by placing matrix material, usually consisting of silicone rubber, over both the model and brackets. The matrix material then assumes a configuration that matches the shape of the replica teeth of the plaster model with the brackets in the desired position. The matrix material then polymerizes and hardens to form a tray. The temporary adhesive is removed, and permanent adhesive is placed on the base of each bracket in the tray, which is then placed over matching portions of the patient's dental arches. Since the configuration of the interior surface of the tray closely matches the respective portions of the patient's dental arches, each bracket location is transferred onto the patient's teeth at precisely the same location that corresponds to the previous location of the same bracket on the plaster model. The adhesive is hardened and the matrix removed, leaving the brackets in the desired positions. This indirect method, however, is labor intensive and fabrication of the intricate details (corresponding to the details of the patient's teeth) of the tray is complex and time-consuming.

SUMMARY

In accordance with one embodiment, a method is provided for fabricating a dental template configured to position an object on teeth of a patient. A digital model of the patient's teeth is created. A template model is then created. The template model includes teeth based on the digital model. Some teeth on the template model include a substantially planar occlusal portion. A dental template is then fabricated using the template model.

BRIEF DESCRIPTION OF THE DRAWINGS

FIG. 1 shows an exemplary process for fabricating a dental template for positioning an orthodontic object on a patient's tooth.

FIG. 2A shows an exemplary process for placing an orthodontic object on a patient's tooth.

FIG. 2B shows another process for placing an orthodontic object on a patient's tooth.

FIG. 3B shows a process for providing four possible templates.

DESCRIPTION

Figure 3A:
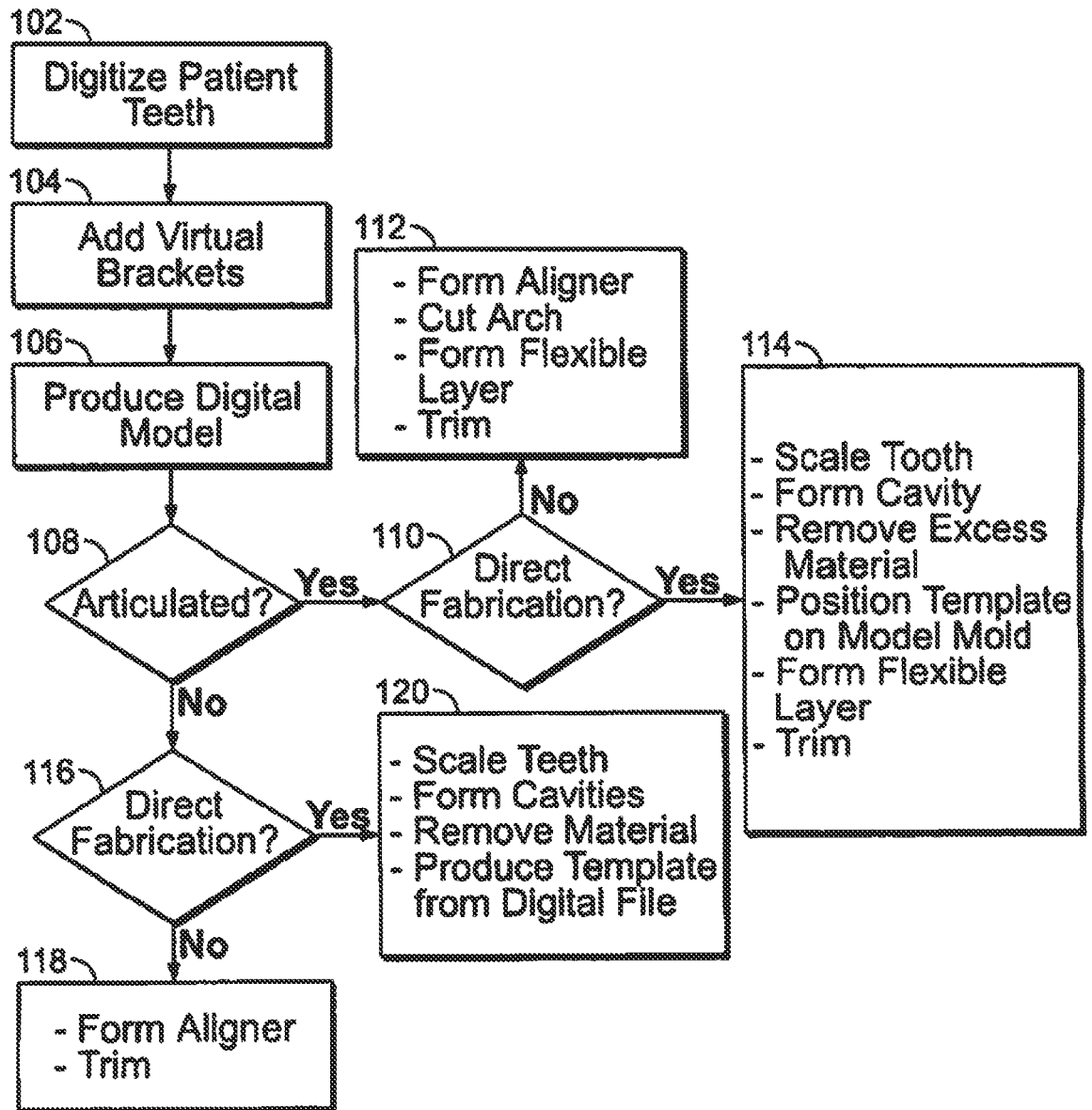
FIG. 3A illustrates an exemplary process for fabricating the dental template

Embodiments of a simplified dental template are disclosed to support positioning an object on a patient's tooth oriented in such a way that all objects as a whole are lined up to a user defined ideal arrangement. The template allows direct bonding of brackets and can be fabricated according to a simplified process, which is also disclosed herein. The process includes digitizing only some of the patient's teeth and/or simplifying the anatomical features of at least some of the patient's teeth; adding virtual objects to predetermined locations on the digitized teeth; and fabricating the dental template to locate the object on the patient's teeth. The dental template is designed to locate each object at a predetermined inclination or a predetermined angulation on the patient's tooth. The template can be used for etching or for positioning brackets on teeth. The skilled artisan will understand that the elements of the template and/or concepts of the fabrication methods described herein can be mixed and matched. For example, a template may be created using some steps from one method and other steps from one or more other methods.

The template is formed of a polymeric shell having a cavity shaped to fit over a patient's teeth and has openings that allow standardized brackets to be accurately positioned on teeth regardless of tooth surface variations from the norm for which the bracket base designed. The treatment can be done virtually and the placement of the brackets can be done using a template device that is a removable guide. This device allows precise placement of the bracket and enables bracket placement onto specific teeth independent of overall arch geometry. The template makes it easier for a less well-trained or an untrained person to bond a bracket. The system minimizes variations in the perception of distance and angles. The template allows precise control of the placement of the bracket. Since bracket placement is one of the critical variables to successful treatment, the template improves treatment precision from patient to patient and from tooth to tooth.

FIG. 1 shows an exemplary process of fabricating a dental template for positioning an object on a patient's tooth. First, the process digitizes the patient's tooth (10). Next, virtual objects are added to pre-determined locations on the digitized tooth (12). Finally, the process fabricates the dental template to locate the object on the patient's tooth (14). One detailed implementation of the method of FIG. 1 is described with reference to FIGS. 3A-3E below.

FIG. 2A shows an exemplary process for placing an orthodontic object on a patient's tooth. The process uses the template fabricated in the process of FIG. 1. The process includes placing the template on the patient's teeth (20); mounting the orthodontic object between the template and the tooth (22); and bonding the orthodontic object to the tooth (24). In the bonding operation, chemical curing or light curing adhesives can be used. In chemical curing, separately supplied curing components are mixed together and a small quantity of the mixture is placed on the back of the bracket prior to placing the bracket on the tooth. Light-curable adhesives include a photo-initiator that initiates the curing reaction once the adhesive is exposed to a sufficient amount of light. A common method of using light-curable adhesives for direct bonding includes the steps of placing a small quantity of the adhesive on the base of the bracket and then placing the bracket on the patient's tooth. The practitioner then shifts the bracket on the tooth as may be needed. Once the bracket is in its intended location, light from a dental curing unit is directed toward the adhesive for a time period sufficient to satisfactorily cure the adhesive.

FIG. 2B shows a second process of placing the orthodontic object on a patient's tooth. In this process, the orthodontic object is placed in the template (30). Next, the process includes inserting the template containing the orthodontic object onto the patient's teeth (32). Finally, the process includes bonding the orthodontic object to the tooth (34).

FIG. 3A illustrates an exemplary process for fabricating the dental template. First, a digital model of a patient's teeth is obtained (102). The digital model can be obtained in a variety of ways. For example, the patient's teeth, or models thereof or impressions may be scanned or imaged using well-known technology, such as two or, three dimensional X-rays, computer-aided tomographic images or data sets, magnetic resonance images, etc. There are a variety of range acquisition systems, generally categorized by whether the process of acquisition requires contact with the three dimensional object (e.g., tooth) to be imaged. A contact-type range acquisition system uses a probe having multiple degrees of translational and/or rotational freedom. By recording the physical displacement of the probe as it is drawn across the sample surface of the object, a computer-readable representation of the sample object is made. A noncontact type range acquisition device can be either a reflective-type or transmissive-type system. There are a variety of reflective systems in use. Some of these reflective systems use non-optical incident energy sources, such as microwave radar or sonar. Others use optical energy. The non-contact type systems working by reflected optical energy further contain special instrumentation configured to permit certain measuring techniques to be performed (e.g., imaging radar, triangulation, and interferometry).

According to one embodiment, a digital model of only certain of the patient's teeth is obtained. For example, at least three teeth are digitized using one of the digitizing or scanning methods described above. According to an embodiment, four teeth are digitized for each of the upper (maxillary) and lower (mandibular) templates. In this embodiment, the four teeth for each of the upper and lower templates include the two central incisors and the two rearmost molars. The skilled artisan will understand that these four teeth can provide stability for positioning the template on a patient's teeth. In an alternative embodiment, three teeth for each of the upper and lower templates can be digitized: one of the central incisors and two mirror-image molars. According to another embodiment, all of the patient's teeth are digitized and a simplified digital model is later created, as discussed in more detail below.

Next, virtual brackets are selected and added (104) to the digital model of the patient's teeth. The virtual brackets are three-dimensional (3D) virtual models of physical brackets. The 3D model may be a computer aided design (CAD) model or may be scanned using scanners, as described above. The virtual brackets may be positioned on a digitized tooth using a computer or workstation having a suitable graphical user interface (GUI) and software appropriate for viewing and modifying the images. The above-described component identification and component manipulation software is designed to operate at sophistication commensurate with the operator's training level. For example, the component manipulation software can assist a computer operator, lacking orthodontic training, by providing feedback regarding permissible and forbidden manipulations on the teeth. On the other hand, an orthodontist, having greater skill in intra-oral physiology and teeth-moving dynamics, can simply use the component identification and manipulation software as a tool and disable or otherwise ignore the device.

While the methods described herein may rely on computer manipulation of digital data, the dental template or appliance may be produced by non-computer-aided techniques. For example, plaster casts, obtained as described above, may be cut using knives, saws, or other cutting tools in order to permit repositioning of individual teeth within the casting. The disconnected teeth may then be held in place by soft wax or other malleable material, and a plurality of intermediate tooth arrangements can then be prepared using such a modified plaster casting of the patient's teeth. The different arrangements can be used to prepare the template using pressure and vacuum molding techniques. While such manual creation of the appliance systems will generally be less preferred, appliance systems so produced will come within the scope of the present invention.

Using the CAD workstation, a combined digital model of the virtual brackets and the teeth can be produced (106). In one implementation, one of the two following template embodiments can be selected: Direct-Unified and Indirect-Unified, as discussed in more detail with reference to FIG. 3B.

Once the template has been fabricated, according to one embodiment, the template is set over the model of the patient's dental arches or otherwise positions the template in the approximate locations of their respective teeth. A thermoformed cast, or otherwise formed layer of flexible material, is deposited on the bodies of the templates and makes relatively durable contact with the bodies of the templates. This method may be performed either in a factory or in an orthodontist's office.

The system can produce both the template bodies and the inter-tooth position(s) at the same time and subsequently alters the stiffness of the various parts. One way of achieving this would be to produce the entire arch with a 3D printer, mask the tooth bodies from the inter-tooth portions, and invest the tooth bodies with a rigidifying agent and the inter-tooth portions with an agent to create flexibility.

As shown in FIG. 3A, from 110, if a directly formed template is produced, the process proceeds to 114, where each tooth is scaled; a cavity is then formed to enclose the tooth when the dental template or appliance is inserted over the patient's teeth. Next, excess material or unnecessary structures (e.g., anatomies of certain teeth, occlusal portions, and gingival portions) are removed from the digital model. The digital model is produced as a physical model. A flexible, pliable layer is formed and the resulting combination is trimmed to allow proper fit and function.

From 108, if a template of a whole arch (not articulated) is to be produced, the process proceeds to 116. In the case of an indirectly-produced template, the process forms an Aligner and excess material is removed (118).

In the case of a directly formed whole arch template, the process proceeds from 116 to 120 where the entire arch is scaled; cavities are then formed to enclose the arch when the dental template or appliance is inserted over the patient's teeth. Next, excess material or unnecessary structures (e.g., certain teeth, occlusal portions, gingival portions) are removed from the digital model. The digital model is produced as a physical model. A flexible, pliable layer is formed and the resulting combination is trimmed to allow proper fit and function.

FIG. 3B shows a process for providing two possible templates. First, the process acquires a digital model of dentition, adds virtual brackets to the teeth, and creates a combined model (180) including the dentition and the virtual brackets. Next, one of two template options can be selected.

Figure 3C:
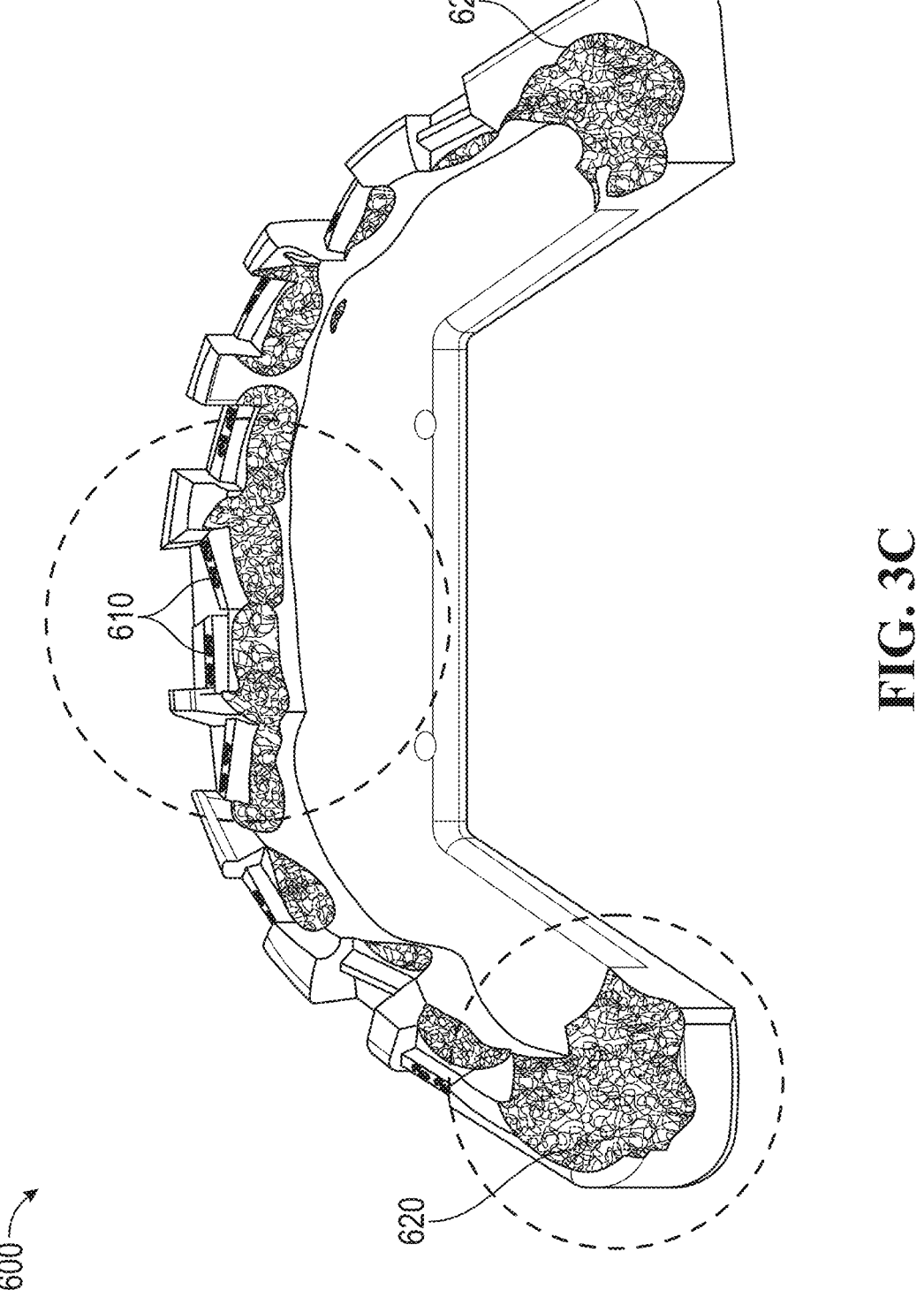
FIG. 3C illustrates an embodiment of a simplified template having only certain reproduced features of a patient's teeth.
Figure 3E:
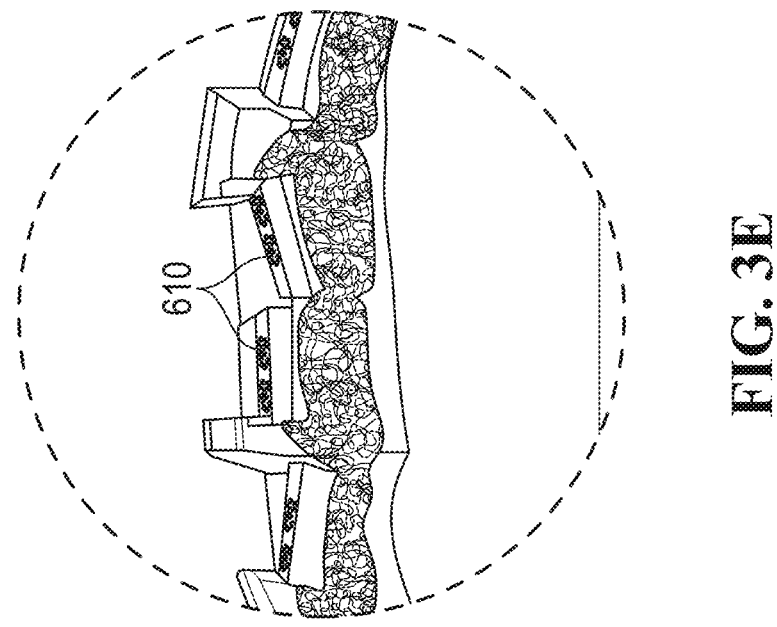
FIG. 3E shows in greater detail the area in circle B of FIG. 3C.
Figure 3D:
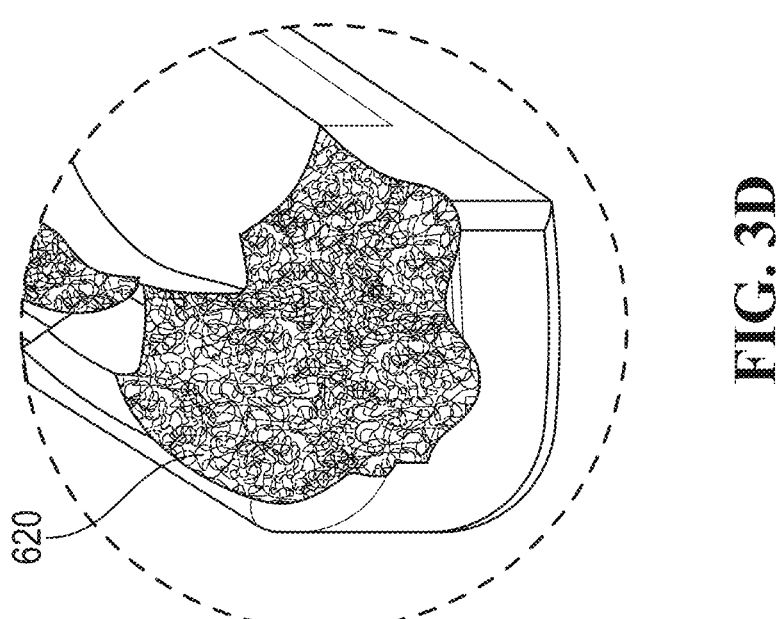
FIG. 3D shows in greater detail the area in circle A of FIG. 3C.

The first option is a unified (or single piece) direct fabrication option where the process scales the patient's dental arch (about 105-150%), locates the original arch and scaled arch in the same 3-D space, creates a cavity of the original inside the scaled arch, removes gingival portions, tooth geometries of the occlusal portions of most teeth except for the positioning teeth, substantial portion of lingual tooth surfaces, substantial portion of the buccal surfaces, and buccogingival surfaces covering virtual brackets, and produces a real arch model from the digital model (182). For example, the occlusal portions of most of the teeth (i.e., teeth that are not used as positioning teeth) in the real arch model (and also the simplified combined digital model) may be substantially planar. According to an embodiment, not only are the tooth geometry features significantly reduced and simplified as noted above, but also the number of teeth having features reproduced; for example, a great deal of the tooth geometries are removed from all teeth except for four or fewer teeth used as positioning teeth. In one exemplary embodiment of a template 600 illustrated in FIGS. 3C-3E, only certain features are reproduced for four positioning teeth in each of the upper (maxillary) and lower (mandibular) templates: the two central incisors 610 (e.g., teeth #24 and #25 in the lower template) and the two rearmost molars 620 (e.g., teeth #19 and #30 in the lower template). For example, the occlusal surfaces are reproduced only for these four teeth 610, 620; the remaining teeth have substantially planar occlusal surfaces because they are simplified. The skilled artisan will appreciate that the four teeth 610, 620 and their reproduced features are useful in positioning the template 600 on the patient's dental arch, and that the simplified real arch model may be fabricated more quickly because it has fewer reproduced features of the patient's teeth. Such a simplified model and template 600 made using such a simplified model also requires less material. According to the embodiment of FIGS. 3C-3E, the template 600 is positioned using only the incisal surfaces of the central incisors 610 and the occlusal surfaces of the rearmost molars 620, rather than using all teeth. As shown in FIGS. 3C-3E, the incisal and occlusal surfaces are reproduced only in the central incisors 610 and rearmost molars 620. As shown in FIG. 3C, the occlusal surfaces of the remaining teeth in the template 600 are substantially planar, as they have been simplified and those of skill in the art will understand that adequate clearance in the upper and lower templates should be provided to limit occlusal surface contact for these other simplified teeth. It will be understood that the reproduced occlusal features of the central incisors 610 and the rearmost molars 620 are used to locate the template 600 along the z-axis and the template walls contacting each tooth's buccal surface are used to locate and secure the template 600 in the x and y direction. The skilled artisan will appreciate that only the occlusal surfaces of the patient's teeth having reproduced occlusal features on the template 600 contact the template 600 when the template is positioned on the patient's teeth. In alternative embodiments, other teeth can be selected for positioning the template. For example, for the upper template, teeth #2, #8, #9, and #15 may be selected and teeth 318, #24, #25, and #31 may be selected for the lower template. Also as noted above, three teeth may be selected: preferably, one of the central incisors and two contra lateral molars. The digital model is then converted to a physical model, likely through the use of a rapid prototyping method (e.g., Fused Deposition Modeling, 3-D Printing, and stereolithography).

In the second option (unified indirect fabrication), the process produces a real model (e.g., mold) of the arch from a simplified digital model and forms a removable appliance (aligner) template on the real model of the arch. The real model can be fabricated using rapid prototyping methods. The skilled artisan will understand that the digital model is simplified by removing occlusal portions and buccal portions such that they are substantially planar in most of the teeth. The template is removed from the real model, and the process continues by removing gingival portions, substantial portion of lingual tooth surfaces, and buccogingival surfaces covering virtual brackets from the template (184). According to an embodiment, not only are the tooth geometry features significantly reduced and simplified, as noted above, but also the number of teeth having features reproduced on the real model of the arch; for example, the entire tooth geometries are removed from all teeth except for four or fewer teeth. In one embodiment, only certain features of four teeth remain for each of the upper (maxillary) and lower (mandibular) templates: the two central incisors and the two rearmost molars. The skilled artisan will appreciate that, as discussed above, these teeth and their reproduced features are useful in positioning the template on the patient's dental arch, and that the simplified real arch model may be fabricated more quickly because it has fewer features of the patient's teeth. The digital model is then converted to a physical model, likely through the use of a rapid prototyping method (e.g., Fused Deposition Modeling, 3-D Printing, and stereolithography).

In one embodiment, the template 600 is made from a thicker material (for example, at least 0.03 inch) to provide the user with more guidance in the depth direction. The thicker material for the template 600 is preferably in a range of about 0.02-0.06 inch, more preferably in a range of about 0.03-0.05 inch, and even more preferably about 0.04 inch. Furthermore, the thicker template allows easier positioning of the bracket to the tooth as there is more bracket surface area supported by the material. The template 600 may be made from materials that contain physical property switches for ease of removal. These switches might include temperature responsive, pH responsive, moisture responsive, or a multi-layer system wherein the layers have varying physical properties. More information on the fabrication of a dental template or appliance is disclosed in U.S. patent application Ser. No. 10/794,324, entitled "Systems and Methods for Fabricating a Dental Template With a 3-D Object Placement," filed Mar. 4, 2004, the entire disclosure of which is hereby incorporated herein by reference.

Another embodiment of the template can be used for etching bonding chemicals on the patient's teeth. An etching template allows the practitioner to precisely etch the areas of the teeth on which the bracket will be placed. The etching template directs the user to predetermined locations on the teeth surface that need to be bonded. The etching template can be either a windowed template or a concave surfaced template where bonding gel is loaded or pre-loaded into the concavity. In some embodiments, cut-outs or windows of the template bound the regions to be etched to minimize teeth sensitivity to etching or unwanted enamel removal. In another embodiment of the etching template, the cut-outs or windows are not formed; instead, those areas are formed as concavities facing the tooth surfaces. The concavities can contain an etching compound, which can be exposed or activated prior to setting the template on the teeth.

Various alternatives, modifications, and equivalents may be used in lieu of the above components. Additionally, the techniques described herein may be implemented in hardware or software, or in a combination of the two. The techniques may be implemented in computer programs executing on programmable computers that each includes a processor, a storage medium readable by the processor (including volatile and nonvolatile memory and/or storage elements), and suitable input and output devices. Each program can be implemented in a high level procedural or object-oriented programming language to operate in conjunction with a computer system. However, the programs can be implemented in assembly or machine language, if desired. The language may also be a compiled or interpreted language. Each such computer program can be stored on a storage medium or device (e.g., CD-ROM, hard disk, magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium causes a computer to operate in a specific and predefined manner. Further, while the invention has been shown and described with reference to an embodiment thereof, those skilled in the art will understand that the above and other changes in form and detail may be made without departing from the spirit and scope of the following claims.

What is claimed is:

1. A dental template, the dental template comprising:
   a first plurality of teeth receiving cavities shaped to receive a first plurality of teeth of a patient, wherein the first plurality of teeth receiving cavities comprise occlusal surfaces corresponding to occlusal surfaces of the first plurality of teeth;
   a second plurality of teeth receiving cavities shaped to receive a second plurality of teeth of the patient, wherein the second plurality of teeth receiving cavities comprise a planar occlusal portion spanning the second plurality of teeth, the planar occlusal portion having a continuous planar geometry comprising fewer occlusal features relative to a number of occlusal features of the second plurality of teeth and wherein buccal surfaces of the second plurality of teeth receiving cavities are configured to conform to buccal surfaces of the second plurality of teeth; and
   one or more openings disposed on buccal surfaces of the second plurality of teeth receiving cavities configured to control placement of one or more objects on the patient's teeth.

2. The dental template of claim 1, wherein the one or more objects comprise objects to be bonded to the patient's teeth.

3. The dental template of claim 1, wherein the one or more objects comprise orthodontic brackets.

4. The dental template of claim 1, wherein the one or more openings are shaped to locate each of the one or more objects at a predetermined orientation on the patient's teeth.

5. The dental template of claim 4, wherein the predetermined orientation comprises a predetermined inclination and/or a predetermined angulation on the patient's teeth.

6. The dental template of claim 1, wherein the dental template is indirectly fabricated.

7. The dental template of claim 1, wherein the dental template is directly fabricated.

8. The dental template of claim 1, wherein the dental template comprises a unitary polymeric body.

9. The dental template of claim 1, wherein the one or more openings are shaped to control placement of one or more objects on the patient's teeth.

10. The dental template of claim 1, wherein the first plurality of teeth comprises no more than four of the patient's teeth.

11. The dental template of claim 1, wherein the first plurality of teeth comprises at least one central incisor.

12. The dental template of claim 1, wherein the first plurality of teeth comprises at least two mirror-image molars.

13. The dental template of claim 1, wherein the one or more openings are shaped and positioned to facilitate disposing bonding chemicals on the patient's teeth.

14. The dental template of claim 1, wherein the occlusal surface of the second plurality of teeth receiving cavities comprises a simplified geometry relative to an occlusal surface of the patient's teeth.

15. The dental template of claim 1, wherein the dental template comprises simplified representations of anatomical features of the second plurality of teeth of the patient.

16. The dental template of claim 1, wherein the one or more openings are shaped to receive standardized orthodontic brackets.

17. The dental template of claim 1, wherein the first plurality of teeth receiving cavities are shaped based in part on a digital scan of the patient's teeth.

18. The dental template of claim 1, wherein the first plurality of teeth receiving cavities reproduces anatomical features of the first plurality of teeth of the patient.

19. The dental template of claim 1, wherein the dental template comprises a thickness of about 0.02 inch to about 0.06 inch.

20. The dental template of claim 1, wherein the dental template comprises a thickness of about 0.04 inch.

* * * * *